United States Patent

Tsurimoto et al.

(10) Patent No.: US 10,158,198 B2
(45) Date of Patent: Dec. 18, 2018

(54) SIGNAL MODULE AND SIGNAL RELAY DEVICE

(71) Applicant: NITTA CORPORATION, Osaka-shi, Osaka (JP)

(72) Inventors: Kenji Tsurimoto, Yamatokoriyama (JP); Nobuhiro Omote, Yamatokoriyama (JP); Yosuke Taniguchi, Yamatokoriyama (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 15/538,652

(22) PCT Filed: Dec. 9, 2015

(86) PCT No.: PCT/JP2015/084532
§ 371 (c)(1),
(2) Date: Jun. 21, 2017

(87) PCT Pub. No.: WO2016/104151
PCT Pub. Date: Jun. 30, 2016

(65) Prior Publication Data
US 2017/0352988 A1 Dec. 7, 2017

(30) Foreign Application Priority Data
Dec. 26, 2014 (JP) .................................. 2014-264306

(51) Int. Cl.
*H01R 9/03* (2006.01)
*H01R 13/659* (2011.01)
(Continued)

(52) U.S. Cl.
CPC .......... *H01R 13/659* (2013.01); *B23K 11/318* (2013.01); *B23K 37/0241* (2013.01);
(Continued)

(58) Field of Classification Search
CPC ............ H01R 13/65802; H01R 13/658; H01R 23/7073
(Continued)

(56) References Cited

U.S. PATENT DOCUMENTS 3,094,364 A * 6/1963 Liagg ................... H01R 13/629
285/154.1
7,195,518 B2 * 3/2007 Bert ...................... H01R 4/2441
439/290

(Continued)

FOREIGN PATENT DOCUMENTS

| JP | H05-301187 | 11/1993 |
| JP | 2010-245045 | 10/2010 |
| JP | 2012-250327 | 12/2012 |

OTHER PUBLICATIONS

International Search Report dated Mar. 1, 2016 in International Application No. PCT/JP2015/084532.

*Primary Examiner* — Thanh Tam Le
(74) *Attorney, Agent, or Firm* — Wentsler LLC (57) ABSTRACT

A signal module and a signal relay device that can suppress the effect of noise are provided, and the signal module is a signal module of a tool changer including a first coupling member to be detachably attached to a body side of an industrial robot and a second coupling member to be detachably attached to a tool side, the signal module including a signal relay connector attached to the first coupling member or the second coupling member, and upon the first coupling member and the second coupling member being coupled, forming a signal path between the first coupling member side and the second coupling member side, wherein in the signal relay connector, a plurality of terminal pairs to be used for communication using differential signals are pro- (Continued)

vided, and two terminals of each of the terminal pairs are arranged at mutually-adjacent positions.

4 Claims, 9 Drawing Sheets

(51) Int. Cl.
    *B25J 15/04*     (2006.01)
    *H04B 15/00*     (2006.01)
    *B23K 37/02*     (2006.01)
    *B23K 11/31*     (2006.01)
    *B25J 19/00*     (2006.01)
    *H01R 13/6598*     (2011.01)
    *H01R 13/6463*     (2011.01)

(52) U.S. Cl.
    CPC ........... *B25J 15/04* (2013.01); *B25J 15/0408* (2013.01); *B25J 19/0033* (2013.01); *H04B 15/00* (2013.01); *H01R 13/6463* (2013.01); *H01R 13/6598* (2013.01)

(58) Field of Classification Search
    USPC .............................. 439/607.43–607.45, 660
    See application file for complete search history.

(56) References Cited

U.S. PATENT DOCUMENTS

| | | | |
|---|---|---|---|
| 7,316,584 B2* | 1/2008 | Mackillop | H01R 13/6463 439/607.05 |
| 7,736,159 B1* | 6/2010 | Effinger, III | H01R 24/86 439/108 |
| 8,029,322 B1* | 10/2011 | Oh | H01R 13/426 439/695 |
| 8,241,068 B2* | 8/2012 | Millard | H01R 13/6461 439/320 |
| 9,236,688 B2* | 1/2016 | Friedhof | H01R 13/6461 |

\* cited by examiner

SIGNAL MODULE AND SIGNAL RELAY DEVICE

TECHNICAL FIELD

The present invention relates to a signal module and a signal relay device.

BACKGROUND ART

As tool changers to be employed for various apparatuses, for example, industrial robots, those including a male member to be attached to the robot side and a female member to be attached to the tool side are disclosed (for example, Patent Literature 1). In these tool changers, upon a cam in the male member being engaged with an engaging member in the female member in a state in which a projection portion provided in the male member is inserted in a coupling hole in the female member, the male member and the female member are coupled. Also, disengagement between the cam and the engaging member enables decoupling between the male member and the female member. In such a manner as above, a tool changer enables change of tools attached to an industrial robot.

Depending on the purpose of use of the robot or the type of the tool, it is necessary to transmit/receive, e.g., control signals between a circuit such as a controller provided on the robot body side and a circuit incorporated in the tool. Where a tool changer is used, the robot body and the tool are coupled/decoupled, and thus, it is necessary to connect/disconnect signal wires between the circuits according to the coupling/decoupling. Signal relay devices that perform such connection/disconnection of signal wires are known. A signal relay device includes signal modules attached respectively to a male member and a female member. The signal modules include respective connectors that, upon the male member and the female member being coupled, cause respective terminals to come into contact with each other and thereby electrically connected, and upon the male member and the female member being decoupled, cancel the contact between the terminals.

CITATION LIST

Patent Literature

Patent Literature 1: Japanese Patent Laid-open No. 2012-250327

SUMMARY OF INVENTION

Technical Problem

However, the case where a signal relay device such as stated above is provided has a problem in that noise is easily superimposed on signals and thus, e.g., malfunction is highly like to occur, compared to a case where connection is provided using cables alone. Also, even if differential signals are used as signals between the circuits, the effect of noise may still be suffered and thus it is necessary to further suppress the effect of noise.

An object of the present invention is to provide a signal module and a signal relay device that can suppress the effect of noise.

Solution to Problem

A signal module according to the present invention is a signal module of a tool changer including a first coupling member to be detachably attached to a body side of an apparatus and a second coupling member to be detachably attached to a tool side, the signal module including a signal relay connector attached to the first coupling member or the second coupling member, and with the first coupling member and the second coupling member being coupled, forming a signal path between the first coupling member side and the second coupling member side, wherein in the signal relay connector, a plurality of terminal pairs to be used for communication using differential signals are provided, and two terminals of each of the terminal pairs are arranged at mutually-adjacent positions.

Also, a signal relay device according to the present invention includes a pair of the signal modules.

Advantageous Effect of Invention

According to the present invention, a plurality of terminal pairs are provided in a connector, so as to correspond to a plurality of inter-circuit signals each made into differential signals, and two terminals of each terminal pair are arranged at mutually-adjacent positions, and thus even if noise is superimposed on respective signals passing through the terminal pair, same noise is superimposed on the respective signals, enabling sufficient suppression of the effect of the noise as differential signals.

DESCRIPTION OF EMBODIMENTS

Figure 1:
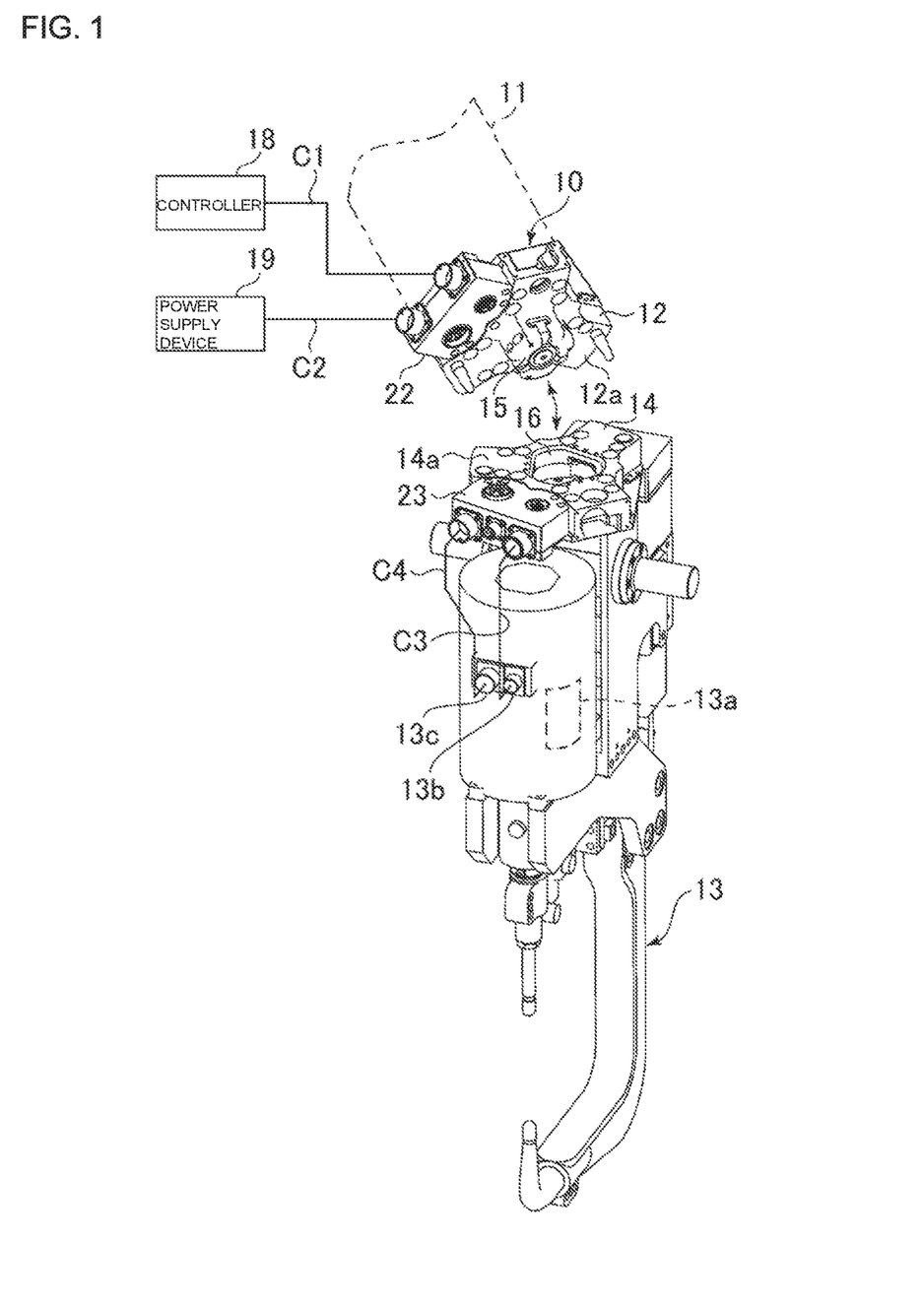
FIG. 1 is a perspective diagram illustrating an overview of an industrial robot including a tool changer with a signal relay device attached thereto.

A tool changer 10, which is illustrated in FIG. 1, includes a male member 12, which is a first coupling member fixed to a distal end of an arm 11, which is a body of an industrial robot, and a female member 14, which is a second coupling member fixed to a tool 13. The arm 11 and the male member 12 are detachably fastened via a non-illustrated fastening tool, for example, a bolt, and the tool 13 and the female member 14 are detachably fastened via a non-illustrated fastening tool, for example, a bolt. In this figure, a spot welding gun is illustrated as the tool 13, but a plurality of different tools with a female member 14 attached thereto are provided. The arm 11 and the tool 13 can be coupled and decoupled via the tool changer 10, enabling change of the tools 13.

In the male member 12, a projection portion 15 is provided at a center of an attaching surface 12a of a body. In the female member 14, a coupling hole 16 is provided in an attaching surface 14a of a body. When the tool 13 is coupled to the arm 11, an engaging mechanism including, e.g., a cam is actuated in a state in which the attaching surface 12a and the attaching surface 14a are brought into abutment with each other and the projection portion 15 is inserted in the coupling hole 16 by means of movement of the arm 11, whereby the male member 12 and the female member 14 are fixed. On the other hand, the tool 13 can be decoupled from the arm 11 by cancelling the fixing using the engaging mechanism and then moving the arm 11 in a direction in which the male member 12 moves away from the female member 14.

A first signal module 22 to which a controller 18 and a power supply device 19 are connected is attached to the male member 12. Also, a second signal module 23 connected to a servomotor unit 13a is attached to the female member 14. A signal relay device is configured by the first signal module 22 and the second signal module 23.

The first signal module 22 and the second signal module 23 are electrically connected or disconnected using later-described respective connectors along with coupling/decoupling between the arm 11 and the tool 13, that is, coupling/decoupling between the male member 12 and the female member 14. Upon electrical connection between the respective signal modules 22 and 23, the controller 18 and the power supply device 19 are connected to the servomotor unit 13a of the tool 13. Consequently, transmission/reception of various types of inter-circuit signals for, for example, controlling a servomotor between the controller 18 and the servomotor unit 13a is enabled, and power supply from the power supply device 19 to the servomotor unit 13a is enabled.

The first signal module 22 and the second signal module 23 have a function of a module for power supply from the robot side to the tool side as well as a function as a signal module that enables transmission/reception, of inter-circuit signals. Also, the controller 18 is a male member 12-side circuit. The stale, member 12-side circuit may be incorporated in a body of the industrial robot or may be provided separately from the body of the industrial robot. The servomotor unit 13a is a tool-side, that is, a female member 14-side circuit including, e.g., the servomotor incorporated in the tool 13, a drive circuit for the tool 13 and a sensor.

Figure 2:
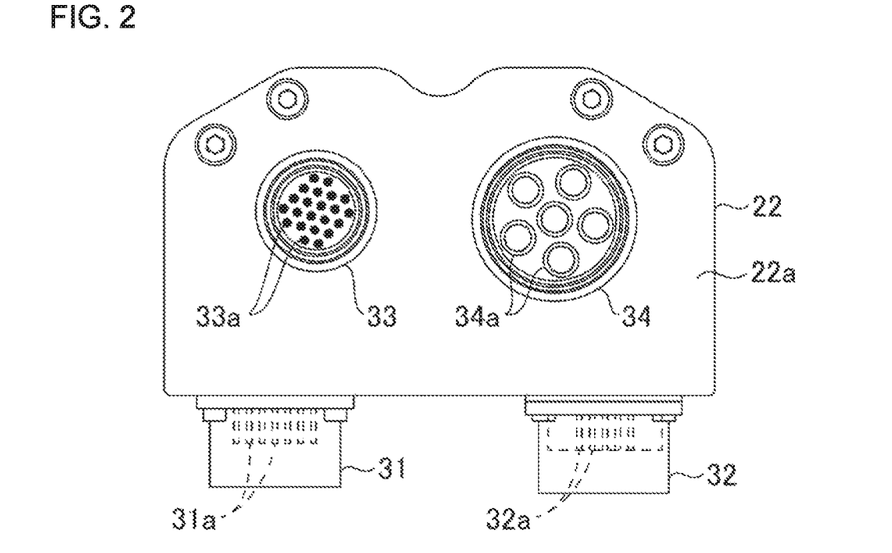
FIG. 2 is a diagram illustrating a connecting surface of a first signal module.

As illustrated in FIG. 2, at a side surface of the first signal module 22, a first circuit-side signal connector 31 and a power input connector 32 are provided. The controller 18 is connected to the first circuit-side signal connector 31 via a cable C1 (see FIG. 1), and the power supply device 19 is connected to the power input connector 32 via a cable C2 (see FIG. 1). Also, in the first signal module 22, a first signal relay connector 33 and a first power relay connector 34, which are of an embedded type, are provided, and connecting end portions of the first signal relay connector 33 and the first power relay connector 34 are exposed at a connecting surface 22a. The connecting surface 22a is a surface that faces a same direction as the attaching surface 12a when the first signal module 22 is attached to the male member 12.

Respective terminals 33a of the first signal relay connector 33 are electrically connected to terminals 31a of the first circuit-side signal connector 31 inside the first signal module 22, and the respective terminals 33a are connected to the mutually-different terminals 31a. Consequently, the first signal relay connector 33 is connected to the controller 18. The number of the terminals 31a and the number of terminals 33a may be determined according to the number of signals necessary for the tool 13, but may be larger than the number of signals necessary for the tool 13.

In the first power relay connector 34, a plurality of terminals 34a are provided, and the respective terminals 34a are electrically connected to terminals 32a of the power input connector 32 inside the first signal module 22. Consequently, power from the power supply device 19 can be supplied from the first power relay connector 34.

Figure 3:
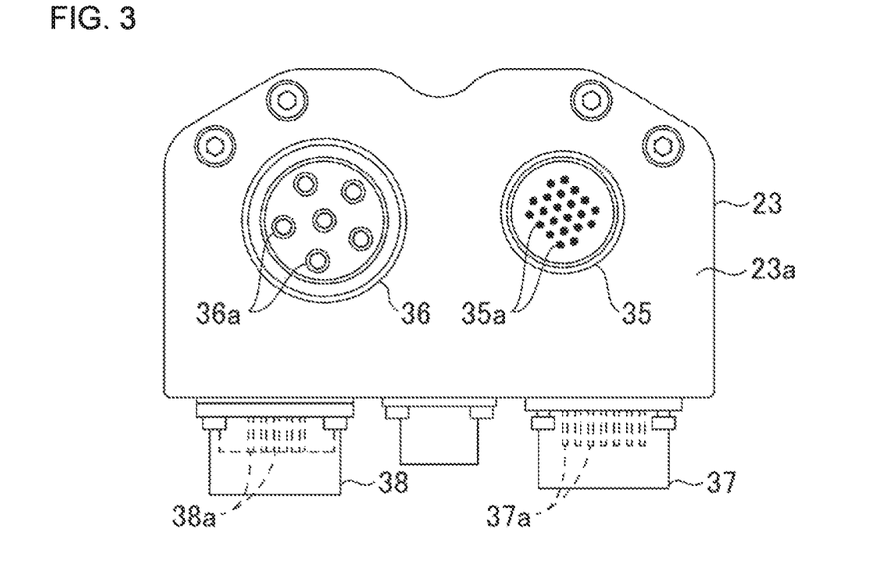
FIG. 3 is a diagram illustrating a connecting surface of a second signal module.

As illustrated in FIG. 3, in the second signal module 23, a second signal relay connector 35 and a second power relay connector 36, which are of an embedded type, are provided, and connecting end portions of the second signal relay connector 35 and the second power relay connector 36 are exposed at a connecting surface 23a. The connecting surface 23a is a surface that faces a same direction as the attaching surface 14a when the second signal module 23 is attached to the female member 14. At a side surface of the second signal module 23, a second circuit-side signal connector 37 and a power output connector 38 are provided. The second circuit-side signal connector 37 and the power output connector 38 are connected to the servomotor unit 13a via cables C3 and C4 and connectors 13b and 13c of the tool 13, respectively.

Respective terminals 35a of the second signal relay connector 35 are electrically connected to terminals 37a of the second circuit-side signal connector 37 inside the second signal module 23, and the respective terminals 37a are connected to the mutually-different terminals 37a. Consequently, the second signal relay connector 35 is connected to the servomotor unit 13a.

The second power relay connector 36 is intended to receive power from the first power relay connector 34, and a plurality of terminals 36a to be connected to the terminals 34a are provided. The respective terminals 36a are electrically connected to terminals 38a of the power output connector 38 inside the second signal module 23. Consequently, power received by the second power relay connector 36 is supplied to the servomotor unit 13a.

In the first signal relay connector 33, the plurality of terminals 33a are provided. In the second signal relay connector 35, a number of terminals 35a, the number being equal to the number of the terminals 33a, are provided. Upon the male member 12 and the female member 14 being coupled, the terminals 33a and the corresponding terminals 35a come into one-by-one contact, whereby the first signal relay connector 33 and the second signal relay connector 35 are electrically connected. Consequently, a signal path between the controller 18 and the servomotor unit 13a is formed, which allows transmission or reception of inter-circuit signals. Also, upon the male member 12 being decoupled from the female member 14, the terminals 33a and the terminals 35a are disconnected. The same applies to the first power relay connector 34 and the second power relay connector 36, and upon the male member 12 and the female member 14 being coupled, the terminal 34a and the terminal 36a are connected, and upon the male member 12 and the female member 14 being decoupled, the connection is cancelled.

Here, in this example, as each of the first signal relay connector 33 and the second signal relay connector 35, for example, a connector called a pin block is used, and shapes and/or types and the like of the connectors and the terminals thereof are not limited to those in the example, and those according to, e.g., electrical characteristics and/or signal types can be used.

In order to reduce the effect of electrical noise from the environment, the controller 18 and the servomotor unit 13a each transmit/receive a plurality of inter-circuit signals in a differential method. In the differential method, as publicly known, one signal to be transmitted is made into differential signals, that is, a pair of signals having mutually-opposite polarities, and the differential signals are simultaneously transmitted using a pair of signal wires, and on the reception side, the signals are received as the voltage between the signal wires.

Figure 4:
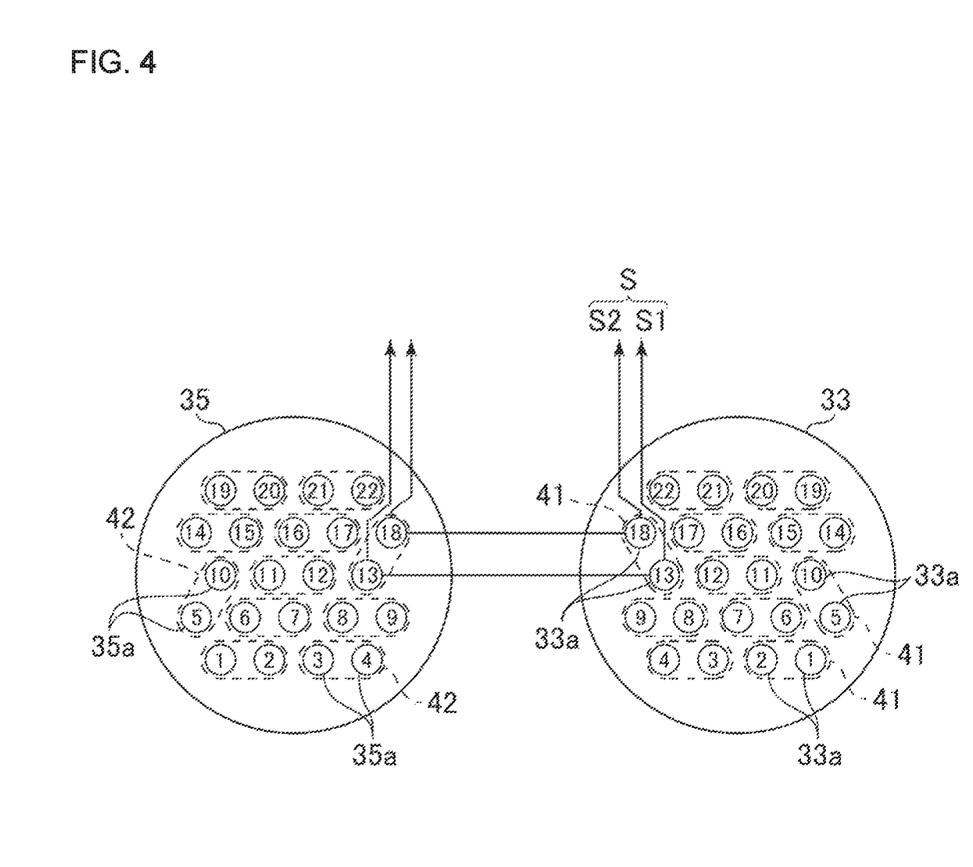
FIG. 4 is a diagram illustrating a relationship between terminal arrangement and differential signals in a first signal relay connector and a second signal relay connector.

As illustrated in FIG. 4, in order to further suppress the effect of noise, in the first signal relay connector 33, respective inter-circuit signals to be each transmitted or received in the form, of differential signals are assigned to terminal pairs 41. Each terminal pair 41 includes a pair of terminals 31a corresponding to a pair of signals that are differential signals, that is, two terminals 31a, and the two terminals 31a of each of the terminal pairs 41 are arranged at mutually-adjacent positions. For example, one inter-circuit signal S, which is made into differential signals, is assigned to a terminal pair 41 including terminals 33a of terminal numbers 13 and 18. A signal S1 of a pair of signals S1 and S2 from the inter-circuit signal S is sent through the terminal 33a of terminal number 13 and the other signal S2 is sent through the terminal 33a of terminal number 18, from the controller 18 to servomotor unit 13a or vice versa. The terminals 35a of the second signal relay connector 35 are connected one by one to the terminals 33a of the first signal relay connector 33. Thus, as with the first signal relay connector 33, respective inter-circuit signals, which are each made into differential signals, are assigned to terminal pairs 42 each including two terminals 35a arranged at mutually-adjacent positions. Here, in FIG. 4, terminal numbers "1, 2, . . . " are indicated in the respective terminals 33a and 35a.

Figure 5:
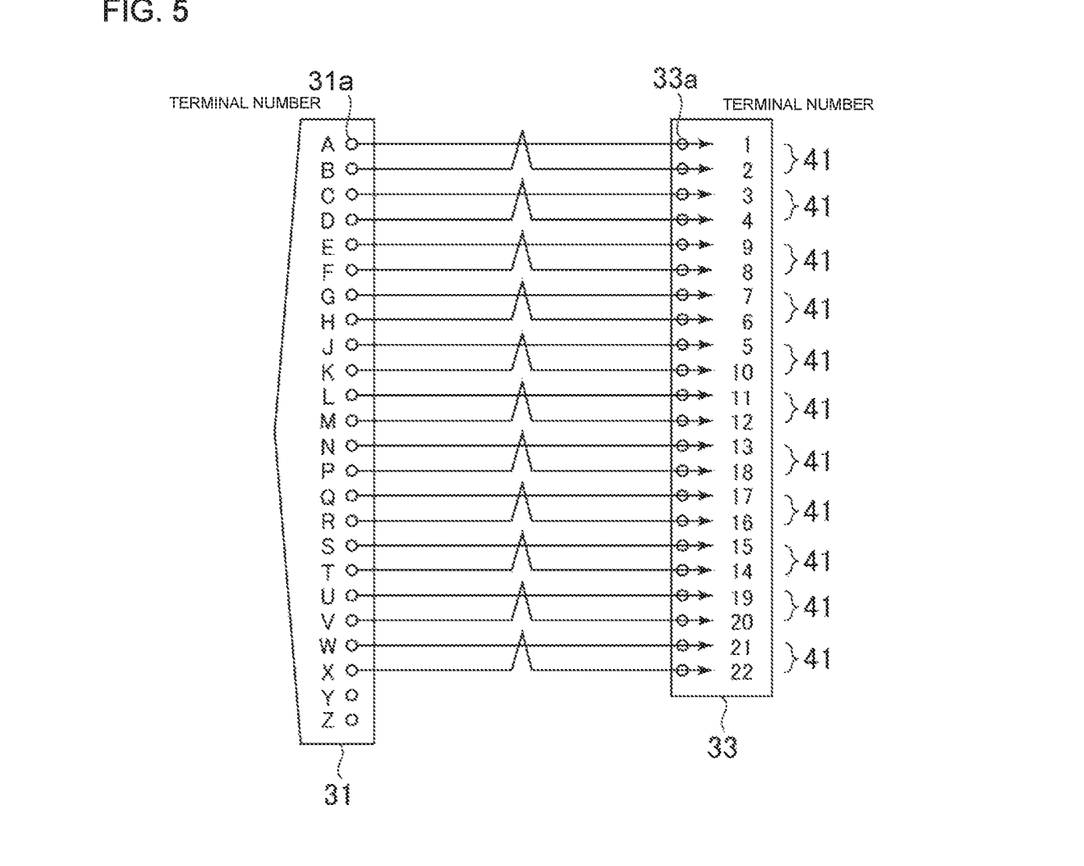
FIG. 5 is a diagram illustrating a state of connection between respective terminals of a first circuit-side signal connector and the first signal relay connector.
Figure 6:
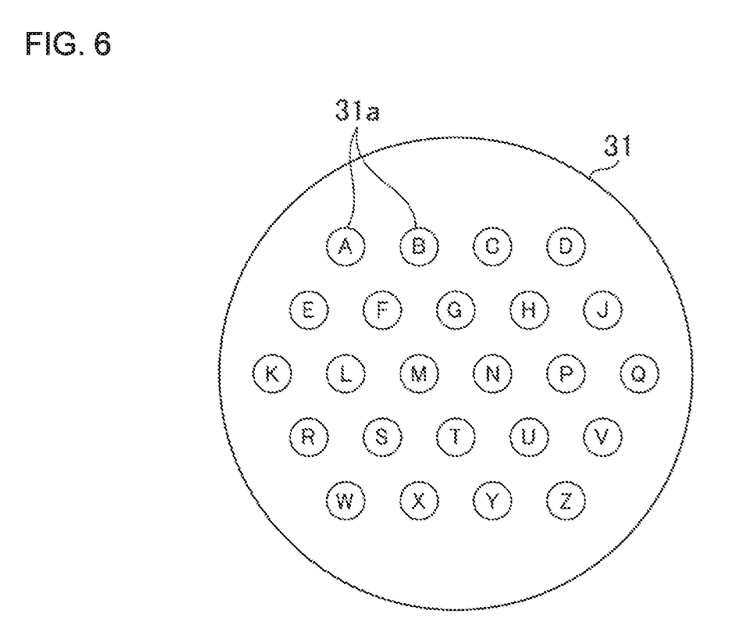
FIG. 6 is a diagram illustrating terminal numbers in the first circuit-side signal connector.

As illustrated in FIGS. 5 and 6, each terminal pair 41 in the first signal relay connector 33 is connected to a pair of terminals 31a in the first circuit-side signal connector 31 by a twisted pair cable. For example, terminals 33a of terminal numbers 5 and 10 are connected to terminals 31a of terminal numbers J and K via a twisted cable. Here, in FIG. 6, terminal numbers "A, B, C, . . . " are indicated in the respective terminals 31a.

Connection between the terminals 35a of the second signal relay connector 35 and the terminals 37a of the second circuit-side signal connector 37 is similar to that of the connection between the first signal relay connector 33 and the first circuit-side signal connector 31, and thus, detailed description thereof will be omitted. In the second signal relay connector 35, also, each pair of terminals 35a to which a pair of signals, which are differential signals, are assigned is connected to a pair of terminals 37a via a twisted pair cable.

Figure 7:
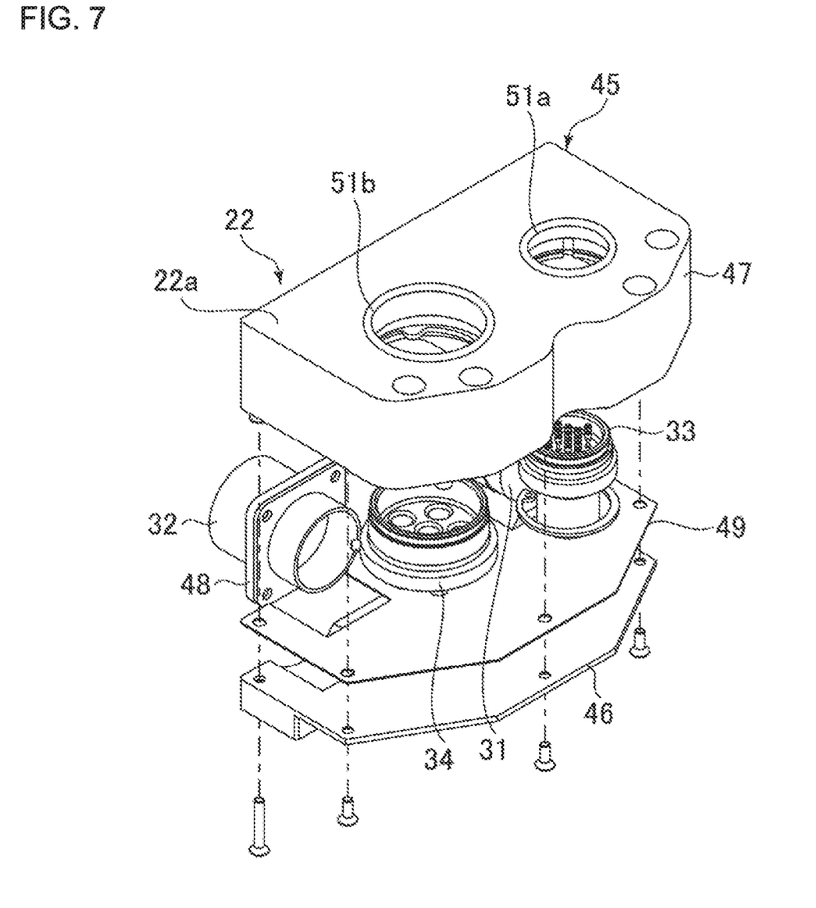
FIG. 7 is an exploded perspective diagram illustrating the first signal module as disassembled.

As illustrated in FIG. 7, in the first signal module 22, the first circuit-side signal connector 31, the power input connector 32, the first signal relay connector 33 and the first power relay connector 34 are assembled to a module body 45. The module body 45 includes a base portion 46 having a plate shape, a cover member 47 and a side plate 48. Also, the first signal module 22 includes a seal member 49 having a plate shape.

Two attaching holes (illustration omitted) are formed in the side plate 48, and the first circuit-side signal connector 31 and the power input connector 32 are assembled to the attaching holes. The side plate 48 is screwed to the cover member 47 in a state in which the connectors 31 and 32 are assembled to the side plate 48. Attaching holes 51a and 51b are formed in the connecting surface 22a of the cover member 47, and the first signal relay connector 33 and the first power relay connector 34 are assembled to the attaching holes 51a and 51b. The seal member 49 is screwed to the cover member 47 in a state in which the seal member 49 is laid on the base portion 46. Consequently, assembling is performed in such a manner that an edge portion of the seal member 49 is sandwiched between the cover member 47 and the base portion 46.

Inside the module body 45, as described above, the terminals 31a of the first circuit-side signal connector 31 and the terminals 33a of the first signal relay connector 33 are electrically connected via twisted pair cables (not illustrated), respectively. Also, the power input connector 32 and the first power relay connector 34 are also connected via cables (not illustrated). The module body 45, that is, the base portion 46, the cover member 47 and the side plate 48, can be formed by a conductive material, for example, aluminum. As described above, the module body 45 having conductivity suppresses entry of electrical noise into the module body 45 and thus reduces superimposition of noise on inter-circuit signals. The second signal module 23 has a configuration that similar to that of the first signal module 22, and a module body of the second signal module 23 is formed of a conductive material and thus suppresses entry of electrical noise to the inside.

Next, operation of the above-described configuration will be described. When the tool 13 is coupled to the arm 11, the attaching surface 12a of the male member 12 is made to face the attaching surface 14a of the female member 14 by moving the arm 11. Next, the male member 12 is moved toward the female member 14 until the attaching surface 12a abuts on the attaching surface 14a, and the projection portion 15 is inserted to the coupling hole 16. Subsequently, the engaging mechanism is actuated to fix the male member 12 and the female member 14 in a coupled state. Consequently, the tool 13 is coupled to the arm 11.

As described above, when the tool 13 is coupled to the arm 11, the first signal module 22 is moved toward the second signal module 23 in a state in which the connecting surface 22a of the first signal module 22 faces the connecting surface 23a of the second signal module 23. Consequently, the first signal relay connector 33 is moved toward the second signal relay connector 35, and upon the arm 11 and the tool 13 being coupled, the terminals 33a of the first signal relay connector 33 and the terminals 35a of the second signal relay connector 35 are connected. Likewise, the first power relay connector 34 is moved toward the second power relay connector 36, and the terminals 34a of the first power relay connector 34 and the terminals 36a of the second power relay connector 36 are connected.

As a result of the first power relay connector 34 and the second power relay connector 36 being connected, power from the power supply device 19 is supplied to the servomotor unit 13a of the tool 13 via the cable C2, the power input connector 32, the first power relay connector 34, the second power relay connector 36, the power output connector 38 and the cable C4.

On the other hand, as a result of the connection between the first signal relay connector 33 and the second signal relay connector 35, the controller 18 and the servomotor unit 13a are electrically connected via the cable C1, the first circuit-side signal connector 31, the first signal relay connector 33, the second signal relay connector 35, the second circuit-side signal connector 37 and the cable C3. Consequently, a signal path is formed between the controller 18 and the servomotor unit 13a, which allows transmission/reception of inter-circuit signals between the controller 18 and the servomotor unit 13a. Then, transmission/reception of all of the inter-circuit signals is performed using differential signals.

For example, upon completion of coupling of the tool 13 to the arm 11 and completion of connection with the servomotor unit 13a being confirmed by the controller 18, work using the tool 13 is started. During the work, electrical noise is generated by, e.g., actuation of the tool 13 and/or actuation of peripheral apparatuses, and if the noise enters the first signal relay connector 33 and/or the second signal relay connector 35, the noise may be superimposed on inter-circuit signals passing through the terminals 33a and/or the terminals 35a. However, for example, in the first signal relay connector 33, a pair of terminals 33a corresponding to differential signals is arranged at mutually-adjacent positions. Thus, noise is superimposed on respective signals passing through the pair of terminals 33a, and in addition, the same noise is superimposed on both signals. Therefore, even if the controller 18 or the servomotor unit 13a receives an inter-circuit signal with noise superimposed thereon, there is almost no effect on a difference between the pair of signals that are differential signals. The same applies to a case where noise is superimposed on the terminals 35a of the second signal relay connector 35.

Also, since the module bodies of the signal modules 22 and 23 are each formed of a conductive material, entry of electrical noise to the inside of the module bodies is suppressed, and the effect of noise is further reduced compared to, for example, module bodies formed of a resin.

Although in the above-described example, for the first signal relay connector 33 and the second signal relay connector 35, each inter-circuit signal, which is made into differential signals, is assigned to a terminal pair including a pair of terminals arranged at mutually-adjacent positions, it is preferable that the same apply to the first circuit-side signal connector 31 and the second circuit-side signal connector 37.

Figure 8:
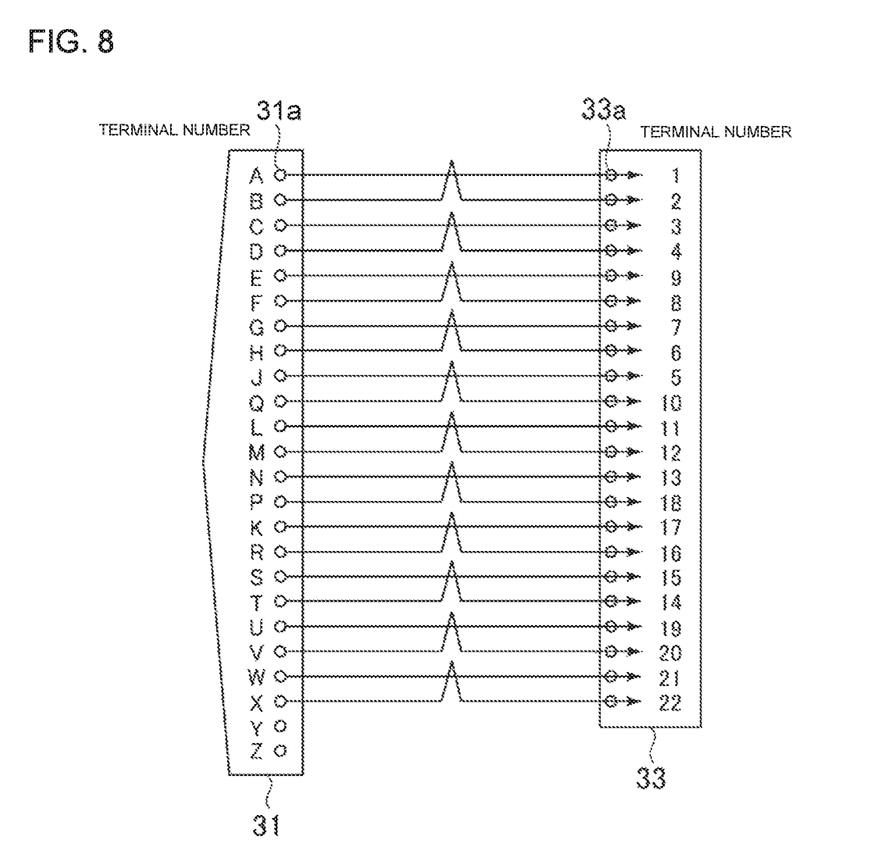
FIG. 8 is a diagram illustrating a state of connection between respective terminals in an example in which terminals for respective differential signals in the first circuit-side signal connector are arranged at mutually-adjacent positions.
Figure 9:
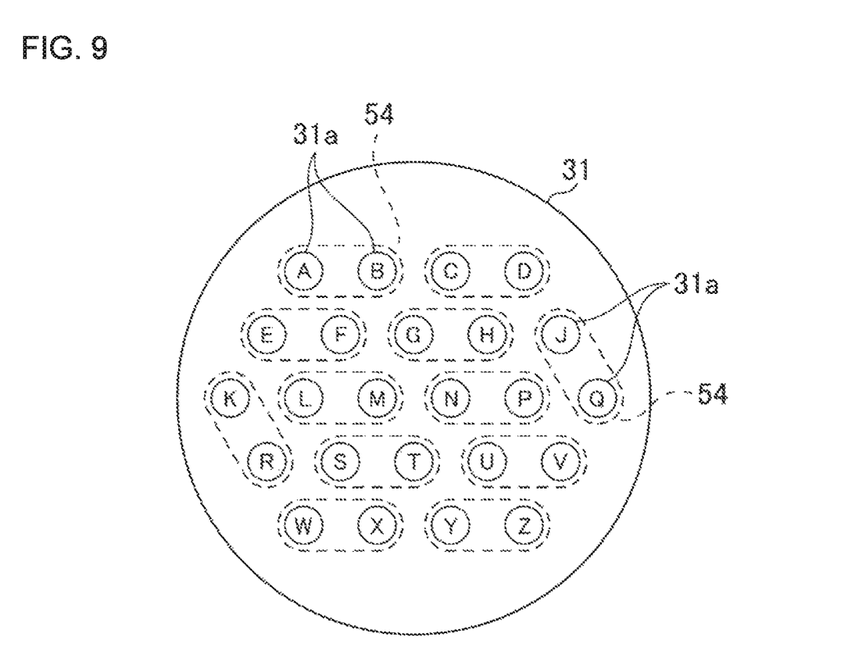
FIG. 9 is a diagram illustrating a relationship between terminal arrangement and differential signals in the first circuit-side signal connector in the example in FIG. 8.

Arrangement of the terminals 31a of the first circuit-side signal connector 31 and the terminals 37a of the second circuit-side signal connector 37 and assignment of signals are determined based on specifications on the controller 18 and tool 13 sides, and thus, in the example in FIGS. 5 and 6, positions of the terminals 31a (terminal numbers J and K) in the first circuit-side signal connector 31 connected to the terminals 33a of terminal numbers 5 and 10 in the first signal relay connector 33 are not mutually adjacent, and positions of terminals 31a (terminal numbers R and Q) connected to terminals 33a of terminal numbers 16 and 17 in the first circuit-side signal connector 31 are not mutually adjacent. Therefore, for example, if an interchange in assignment of signals to terminals on a cable C1-side connector (not illustrated) that are to be connected to the terminals 31a of terminal numbers K and Q is possible, as illustrated in FIG. 8, the terminals 33a of terminal numbers 5 and 10 in the first signal relay connector 33 are connected to the terminals 31a of terminal numbers J and Q in the first circuit-side signal connector 31, and the terminals 33a of terminal numbers 16 and 17 are connected to the terminals 31a of terminal numbers R and K. Consequently, as illustrated in FIG. 9, in the first circuit-side signal connector 31, all inter-circuit signals, which are each made into differential signals, can be assigned to respective terminal pairs 54 each including two terminals 31a arranged at mutually-adjacent positions.

Figure 10:
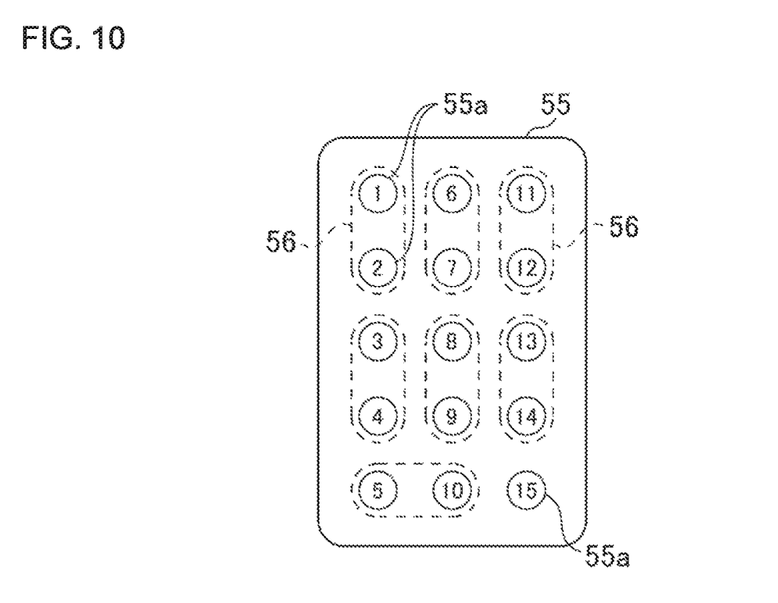
FIG. 10 is a diagram illustrating an example using a rectangular first signal relay connector.
Figure 11:
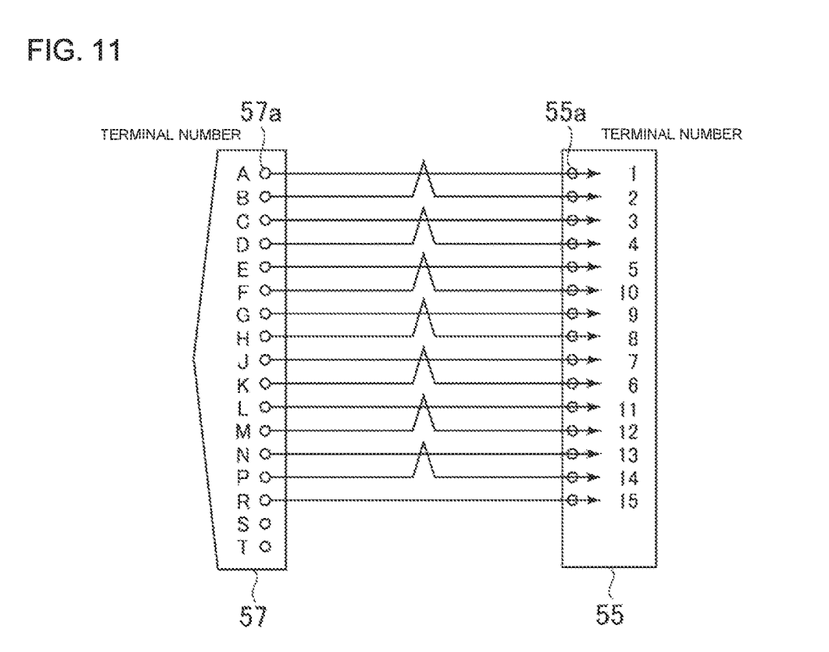
FIG. 11 is a diagram illustrating a state of connection, between respective terminals in the example in FIG. 10.
Figure 12:
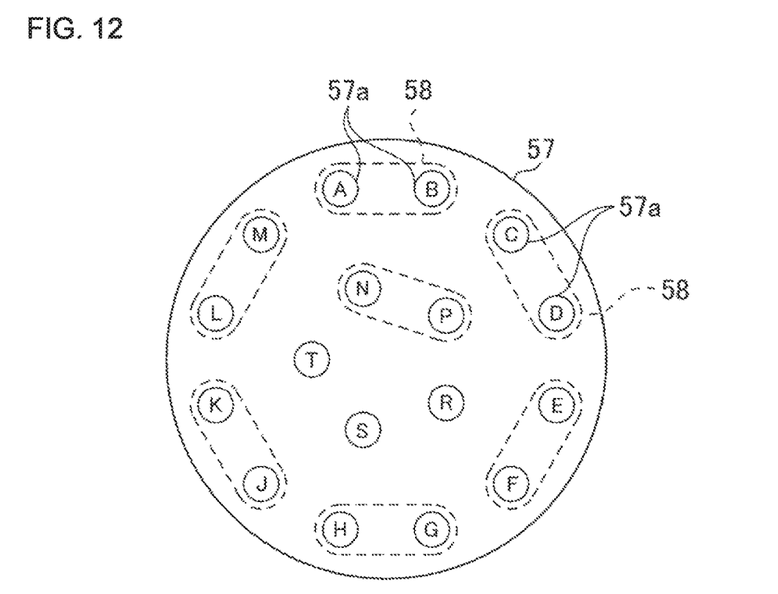
FIG. 12 is a diagram illustrating a relationship between terminal arrangement and differential signals in the first circuit-side signal connector in FIG. 11.

The present invention is not limited to the above-described embodiment, and arbitrary changes are possible within the scope of the spirit of the present invention. In the above-described example, those having a round shape are used as the signal relay connectors 33 and 35, but, for example, those having a rectangular shape may be employed. FIG. 10 indicates an example of a rectangular first signal relay connector 55 including 15 terminals. Seven terminal pairs 56 are formed by terminals 55a of terminal numbers 1 to 14 except a terminal 55a of terminal number 15, and respective inter-circuit signals, which are each made into differential signals, are assigned to the respective terminal pairs 56. Each terminal pair 56 is formed of a pair of terminals 55a arranged at mutually-adjacent positions. The terminal 55a of terminal number 15 is used for, for example, a ground. As illustrated in FIG. 11, a first circuit-side signal connector 57 including 17 terminals is connected to the first signal relay connector 55, and the terminals 55a of the terminal pairs 56 are connected to respective terminals 57a of the first circuit-side signal connector 57 via respective twisted pair cables. As illustrated in FIG. 12, in the first circuit-side signal connector 57, also, differential signals are assigned to each of seven terminal pairs 58 each including a pair of terminals 57a arranged at mutually-adjacent positions.

Although each of the above embodiments has been described in terms of a case of an industrial robot as an example of an apparatus, an apparatus to which a tool changer including signal modules is attached is not limited to an industrial robot. For example, the apparatus may be a tool attached to, e.g., an arm, or a balance arm or a hand crane that facilitate movement of an object grasped by the tool or work at a destination of the movement. Also, although the first coupling member is attached to the arm of the industrial robot on the body side of the apparatus, as the position of the attachment, an arbitrary position in the body of the apparatus may be determined according to, e.g., the configuration of the apparatus and/or the type of the tool.

REFERENCE SIGNS LIST 10 tool changer
11 arm
12 male member
13 tool
13a servomotor unit
14 female member
18 controller
22, 23 signal module
31, 37, 57 signal connector
33, 35, 55 signal relay connector
31a, 33a, 35a, 37a, 55a, 57a terminal
41, 42, 54, 56, 58 terminal pair

The invention claimed is:

1. A signal module (22, 23) of a tool changer (10) including a first coupling member (12) to be detachably attached to a body side of an apparatus and a second coupling member (14) to be detachably attached to a tool side, the signal module (22, 23) being configured to form a signal path between the first coupling member (12) and the second coupling member (14) by abutting a first attaching surface (12a) of the first coupling member (12) and a second attaching surface (14a) of the second coupling member (14) and coupling the first coupling member (12) and the second coupling member (14), the signal module (22, 23) comprising:
- a first module body (45) attached to the first coupling member (12), the first module body (45) having a first connecting surface (22a) facing the same direction as the first attaching surface (12a) and a first side surface orthogonal to the first connecting surface (22a);
- a first signal relay connector (33, 55) provided on the first connecting surface (22a);
- a first circuit-side signal connector (31, 57) provided on the first side surface;
- a second module body (45) attached to the second coupling member (14), the second module body (45) having a second connecting surface (23a) facing the same direction as the second attaching surface (14a) and a second side surface orthogonal to the second connecting surface (23a);
- a second signal relay connector (35) provided on the second connecting surface (23a), the second signal relay connector (35) being configured to be connected to the first signal relay connector (33, 55) by coupling the first coupling member (12) and the second coupling member (14); and
- a second circuit-side signal connector (37) provided on the second side surface,
- wherein the first signal relay connector (33, 55) has a plurality of first terminal pairs (41, 56) including a plurality of first terminals (33a), the plurality of first terminal pairs (41, 56) are used for communication using differential signals, each of the first terminals (33a) is arranged with gaps from at least three other first terminals (33a), the first terminal pair (41, 56) is composed of two adjacent first terminals (33a),
- the first circuit-side signal connector (31, 57) has a plurality of first circuit-side terminal pairs (54, 58) including a plurality of first circuit-side terminals (31a, 57a), the first circuit-side terminal pair (54, 58) is connected the first terminal pair (41, 56) inside the first module body (45) via a twisted pair cable,
- the second signal relay connector (35) has a plurality of second terminal pairs (42) including a plurality of second terminals (35a), each of the second terminals (35a) is arranged with gaps from at least three other second terminals (35a), the second terminal pair (42) is configured to be connected to the first terminal pair (41, 56) by coupling the first coupling member (12) and the second coupling member (14), and
- the second circuit-side signal connector (37) has a plurality of second circuit-side terminal pairs including a plurality of second circuit-side terminals (37a), the second circuit-side terminal pair is connected the second terminal pair (42) inside the second module body (45) via a twisted pair cable.

2. The signal module (22, 23) according to claim 1, further comprising:
- a first power relay connector (34) provided on the first connecting surface (22a);
- a power input connector (32) provided on the first side surface, the power input connector (32) being connected to the first power relay connector (34) inside the first module body (45);
- a second power relay connector (36) provided on the second connecting surface (23a), and
- a power output connector (38) provided on the second side surface, the power output connector (38) being connected to the second power relay connector (36) inside the second module body (45).

3. The signal module (22, 23) according to claim 2, wherein the first module body (45) and the second module body (45) are formed of a conductive material.

4. A signal relay device comprising the signal modules (22, 23) according to claim 1.

* * * * *

UNITED STATES PATENT AND TRADEMARK OFFICE
CERTIFICATE OF CORRECTION

PATENT NO. : 10,158,198 B2
APPLICATION NO. : 15/538652
DATED : December 18, 2018
INVENTOR(S) : Kenji Tsurimoto, Nobuhiro Omote and Yosuke Taniguchi It is certified that error appears in the above-identified patent and that said Letters Patent is hereby corrected as shown below:

In the Specification

On Column 3, Line 52, "The stale, member 12-side circuit" should read --The male member 12-side circuit--.

Signed and Sealed this
Nineteenth Day of February, 2019

Andrei Iancu
*Director of the United States Patent and Trademark Office*